United States Patent [19]

Riley et al.

[11] 4,391,585

[45] Jul. 5, 1983

[54] METHOD OF OPERATING A CONTINUOUS CERAMIC KILN

[75] Inventors: Eric K. Riley, Wombourne; Colin D. Smith, Alsager; Garry J. Yates, Knutsford; Norris W. Shepherd, Worksop, all of England

[73] Assignee: Air Products and Chemicals, Inc., Allentown, Pa.

[21] Appl. No.: 245,811

[22] Filed: Mar. 20, 1981

[30] Foreign Application Priority Data

Mar. 26, 1980 [GB] United Kingdom ................ 8010147

[51] Int. Cl.³ .......................... F27B 9/04; F27B 9/40; F26B 3/00
[52] U.S. Cl. ......................................... 432/23; 34/36; 432/37
[58] Field of Search ............. 432/23, 25, 26, 37, 432/38, 145; 34/36

[56] References Cited

U.S. PATENT DOCUMENTS

| | | | |
|---|---|---|---|
| 2,567,556 | 9/1951 | Dressler et al. | 264/64 |
| 3,227,782 | 1/1966 | Gie et al. | 432/23 |
| 3,459,412 | 8/1969 | Fries et al. | 432/18 |
| 3,542,349 | 11/1970 | Shimotsuma et al. | 432/23 |
| 4,223,450 | 9/1980 | Rothchild | 34/36 |
| 4,329,142 | 5/1982 | Dyer | 432/23 |

FOREIGN PATENT DOCUMENTS

1422689 1/1976 United Kingdom .

Primary Examiner—John J. Camby
Attorney, Agent, or Firm—James C. Simmons; E. Eugene Innis

[57] ABSTRACT

A method of operating a continuous ceramic kiln having a decarbonization zone characterized in that oxygen or oxygen enriched air is added to the decarbonization zone to maintain the average oxygen concentration in the decarbonization zone at or about a predetermined level. The predetermined level need only be adjusted for different throughputs and need not be adjusted for moderate changes in the amount of organic matter in the clay.

6 Claims, 1 Drawing Figure

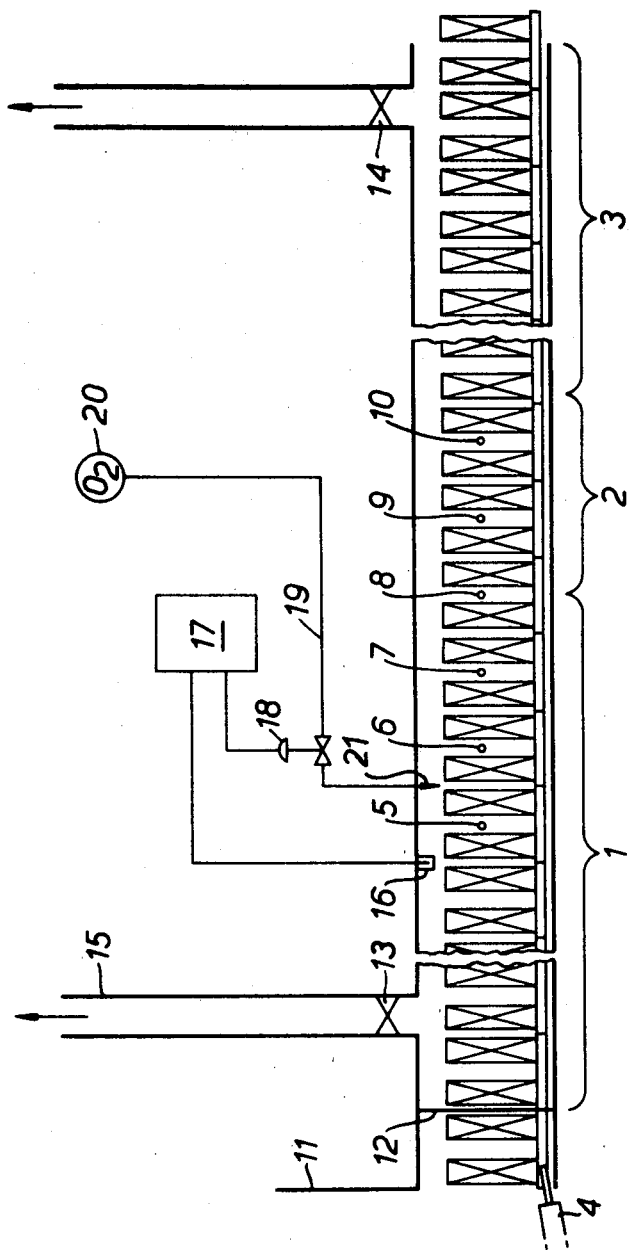

METHOD OF OPERATING A CONTINUOUS CERAMIC KILN

This invention relates to a method of operating a continuous ceramic kiln and, more particularly but not exclusively, is concerned with a method of operating a continuous brick kiln.

During the manufacture of bricks the shaped clay is usually dried, heated progressively to about 900° C. in a decarbonization zone to oxidize any organic matter in the clay, fired and then cooled. Occasionally all five operations are carried out in a continuous brick kiln although part of the initial drying and final cooling are occasionally effected away from the continuous brick kiln.

Typically the entire operation from extrusion of the clay to finished brick takes about 110 hours for a superior quality brick.

In many continuous brick kilns the minimum time of the entire operation from clay to finished brick is determined by the rate at which the organic matter in the clay can be oxidized prior to firing. In this connection, once the clay reaches approximately 920° C., a sealing layer forms which is substantially impervious to gas formed by the oxidation of the organic matter and above this temperature no further decarbonization occurs. If this 920° C. level is reached too quickly the resulting bricks have "black hearts" and have to be sold as seconds.

It has been suggested that removal of the organic matter can be accelerated by enriching the atmosphere in the decarbonization zone with oxygen. However, previous proposals have involved the use of very large quantities of oxygen thus rendering the processes economically unviable.

As a practical matter, the organic matter content of clay varies considerably from batch to batch (typically from 1.1 to 1.6% by weight) and indeed many clay workings contain large man made mounds of clay which contain too much organic matter to be dealt with economically by a continuous brick kiln due to the very long decarbonization times which would be necessary to oxidize the organic matter.

At first, we believed that in order to minimize the amount of additional oxygen necessary to reduce decarbonization time it would be necessary to continuously monitor the organic content of the clay entering the kiln. However, we have found that this can be obviated simply by adding sufficient oxygen or oxygen enriched air to the decarbonization zone of the kiln to maintain the average oxygen concentration in the decarbonization zone at a predetermined level.

In order to measure the oxygen concentration a probe is preferably used which is preferably mounted in the roof of the kiln at a position in the decarbonization zone where the temperature is nominally between 700° and 875° C., preferably between 750° and 850° C. and advantageously at 800° C.

The oxygen necessary to maintain the oxygen concentration in the decarbonization zone at the predetermined level can be introduced at any point where the gas flows from the firing zone to the brick inlet and a point just upstream of the oxygen probe. However, there is little point in injecting the oxygen at a point where the temperature is above 920° C. in view of the formation of the sealing layer referred to hereinbefore. Preferably the point of injection of the oxygen or oxygen enriched air is where the nominal temperature of the kiln is between 800° and 950° C. and preferably at 900° C.; and in a position where the injected oxygen will flow through the decarbonization zone.

Preferably the predetermined level is between 7.5 and 11% oxygen (by volume) and more preferably between 8 and 9.5% oxygen (by volume).

Generally, the predetermined level may be determined by the equation:

$$C = \frac{R_2}{R_1} A(1 + X)$$

where
C is the predetermined level at a point in the decarbonization zone;
$R_1$ is the throughput of clayware articles during satisfactory operation of the kiln without oxygen addition;
A is the average oxygen concentration at said point during satisfactory operation of the kiln without oxygen addition at throughput rate $R_1$;
$R_2$ is the new throughput of clayware articles; and
$0 \leq X \leq 0.5$ For a better understanding of the invention reference will now be made, by way of example, to the accompanying drawing which is a schematic cross-section of a continuous brick kiln in accordance with the present invention.

Referring to the drawing, there is shown a continuous brick kiln which contains 76 kiln cars which are pushed through a drying and decarbonization zone 1, a firing zone 2 and a cooling zone 3 by a hydraulic ram 4. Each kiln car is in physical contact with the next kiln car and contains two stacks of bricks. The stacks are so arranged that adjacent stacks are separated by about 18 inches (45.7 cm).

Typically the kiln cars are advanced through the kiln by one half cars' length at the end of each period of forty minutes. The operation of advancing the kiln cars is generally referred to as a "push".

The drying and decarbonization zone 1 and the firing zone 2 are both provided with gas fired burners 5 to 10 which are mounted in the wall of the kiln. It is important that the flames from these burners do not impinge directly on the bricks and the burners are therefore turned to their minimum firing rate immediately preceding a push and are then returned to normal operation at the end of the push.

A pair of doors 11 and 12 are situated at the brick inlet of the kiln and are opened and closed alternately to minimize air flow through the inlet as new kiln cars are introduced into the kiln.

Extractor fans 13 and 14 are mounted on the top of the kiln 1 as shown. Fan 13 draws hot combustion gases from the firing zone 2 through the pre-heating and decarbonizing zone 1 and vents them to atmosphere via chimney 15. The doors 11 and 12 minimize the volume of air which passes through the brick inlet.

Extractor fan 14 draws part of the air entering brick outlet and passes it to driers (not shown).

An oxygen probe 16 is mounted in the roof of the kiln at a position where the gas temperature is nominally at 800° C. The oxygen probe is connected to a computer 17 which monitors the oxygen concentration ten times a second. The computer 17 is connected to a linear valve 18 situated in a line 19 extending between a liquid oxygen supply vessel 20 and an injection nozzle 21.

In use, and only during the period between pushes, the computer continually adjusts the linear valve 18 in response to the oxygen concentration to try and maintain the average oxygen concentration at the oxygen probe 16 throughout the period at a predetermined value. This value is almost directly related to the push rate through the kiln.

In order to compare the present invention with the prior art, the average oxygen concentration between pushes measured by oxygen probe 16 during operation of the kiln without the addition of oxygen over a period of several days was 7% (by volume) and the push rate through the kiln was 16.7 cars per day.

In order to increase the production rate by 15% to 19.2 cars per day we have found that sufficient oxygen need be provided to maintain the average oxygen concentration between pushes at 8%.

A rule of thumb which we have developed for determining the average oxygen concentration is:

$$C = \frac{R_2}{R_1} A(1 + X)$$

where
C is the average oxygen concentration at the probe maintained by the injection of oxygen;
$R_1$ is the push rate during satisfactory operation of the kiln without oxygen addition;
A is the average concentration at the probe during satisfactory operation of the kiln without oxygen addition at push rate $R_1$;
$R_2$ is the push rate using oxygen injection; and
$0 \leq X \leq 0.5$ (usually between 0 and 0.2 and preferably 0.1).

Bearing in mind that there is a practical limit to the push rate, the average oxygen concentration will normally be maintained between 8 and 11% between pushes. We prefer not to monitor the oxygen content at probe 16 during pushes since changes in atmospheric conditions due to the burners being turned down and the doors 11 and 12 being moved cause large fluctuations in the oxygen concentration which could result in inappropriate amounts of oxygen being added to the kiln.

In order to appreciate the present invention it should perhaps be noted that during normal operation of the subject brick kiln the oxygen concentration at probe 16 without oxygen addition varied continuously between 2% and 14% according to whether the burners in the firing zone or the preheating zone were on high fire or low fire, whether the kiln doors were open or closed, and whether the wind was in the south or in the north thereby affecting the kiln draught.

We claim:

1. A method of decarbonizing shaped ceramic articles in an intermittent push continuous ceramic kiln having a heating and decarbonizing zone, a firing zone and a cooling zone fitted with means to sense the concentration of oxygen in the decarbonizing zone, said means associated with a control fitted to oxygen or oxygen enriched air injection means associated with said decarbonizing zone comprising the steps of:
   progressively heating said shaped ceramic articles to about 900° C. in the decarbonizing zone to oxidize organic matter contained in the articles;
   maintaining the oxygen concentration of the decarbonization zone at a minimum level of 7.5% by volume between pushes as determined by the equation:

$$C = \frac{R_2}{R_1} A(1 + X)$$

where
C is the predetermined level at a point in the decarbonization zone;
$R_1$ is the throughput of clayware articles during satisfactory operation of the kiln without oxygen addition;
A is the average oxygen concentration at said point during satisfactory operation of the kiln without oxygen addition at throughput rate $R_1$;
$R_2$ is the new throughput of clayware articles; and
X is between the limits of $\geq 0$ and $\leq 0.5$,
by adding oxygen or oxygen enriched air to the decarbonization zone;
continuing heating of said shaped ceramic articles until firing is completed; and
cooling said shaped ceramic articles to ambient temperature.

2. A method according to claim 1, characterized in that the concentration of oxygen in the decarbonization zone is measured at a point in the decarbonization zone where the temperature is nominally between 700° and 875° C.

3. A method according to claim 2, characterized in that said temperature is nominally between 750° and 850° C.

4. A method according to claim 1, characterized in that the oxygen or oxygen enriched air is injected into the kiln at a position where the nominal kiln temperature is between 800° and 950° C. and where the injected oxygen will flow through the decarbonization zone.

5. A method according to claim 1, characterized in that said predetermined level is between 7.5 and 11% oxygen (by volume).

6. A method according to claim 5, characterized in that said predetermined level is between 8 and 8.5% oxygen (by volume).

* * * * *